US 8,056,671 B2

(12) United States Patent
Ikegami et al.

(10) Patent No.: US 8,056,671 B2
(45) Date of Patent: Nov. 15, 2011

(54) EXHAUST-GAS PURIFICATION DEVICE DISPOSITION STRUCTURE OF VEHICLE (75) Inventors: Makoto Ikegami, Hirsohima (JP); Yukiichirou Shimada, Higashihiroshima (JP); Noritaka Sakiyama, Hiroshima (JP); Noriyoshi Sahashi, Hatsukaichi (JP); Kota Matsue, Higashihiroshima (JP); Chikara Ishihara, Hiroshima (JP); Shinya Matsumoto, Higashihiroshima (JP); Yoshikazu Nishimura, Hiroshima (JP); Yoshiaki Murakami, Hiroshima (JP); Masamitsu Tanaka, Hiroshima (JP); Ken Ueki, Hiroshima (JP)

(73) Assignee: Mazda Motor Corporation (JP)

( * ) Notice: Subject to any disclaimer, the term of this patent is extended or adjusted under 35 U.S.C. 154(b) by 543 days.

(21) Appl. No.: 12/247,253

(22) Filed: Oct. 8, 2008

(65) Prior Publication Data

US 2009/0094968 A1 Apr. 16, 2009

(30) Foreign Application Priority Data

Oct. 12, 2007 (JP) ................. 2007-266754
Oct. 12, 2007 (JP) ................. 2007-266830
Sep. 24, 2008 (JP) ................. 2008-243997

(51) Int. Cl.
*B60K 13/04* (2006.01)
*F01N 3/00* (2006.01)
(52) U.S. Cl. ........................ 180/309; 60/295
(58) Field of Classification Search .............. 180/309; 60/272, 286, 310
See application file for complete search history.

(56) References Cited

U.S. PATENT DOCUMENTS

| 3,911,971 | A | * | 10/1975 | Smithson et al. | 141/1 |
| 4,596,277 | A | * | 6/1986 | Djordjevic | 141/98 |
| 5,665,318 | A | * | 9/1997 | Rembold et al. | 422/177 |
| 5,758,496 | A | * | 6/1998 | Rao et al. | 60/295 |
| 5,976,475 | A | * | 11/1999 | Peter-Hoblyn et al. | 423/212 |
| 6,063,350 | A | * | 5/2000 | Tarabulski et al. | 423/239.1 |
| 6,167,698 | B1 | * | 1/2001 | King et al. | 60/286 |
| 6,374,868 | B1 | * | 4/2002 | Channing | 141/9 |
| 6,415,602 | B1 | * | 7/2002 | Patchett et al. | 60/286 |

(Continued)

FOREIGN PATENT DOCUMENTS

DE 102006015252 B3 6/2007

(Continued)

OTHER PUBLICATIONS

European search report dated Jan. 19, 2009 for EP application No. 08017918.7/ Patent No. 1263 Reference No. M5134 EU-ds (Full).

*Primary Examiner* — J. Allen Shriver, II
*Assistant Examiner* — Jacob Meyer
(74) *Attorney, Agent, or Firm* — Studebaker & Brackett PC; Donald R. Studebaker (57) ABSTRACT An exhaust-gas purification device disposition structure of a vehicle, comprises a fuel tank with a fuel supply port which is disposed so as to be open to an outside of a vehicle compartment, and a urea tank to accommodate urea water solution as deoxidizer to purify exhaust gas. The urea tank is disposed outside the vehicle compartment, and a pouring port of the urea tank is provided inside the vehicle compartment. Accordingly, the urea water solution can be surely prevented from entering into the vehicle compartment even in case of the breakage of the urea tank, and the mistake of supplying the wrong liquid into the wrong supply (pouring) port tank which may be made by confusing the ports can be avoided.

18 Claims, 8 Drawing Sheets

U.S. PATENT DOCUMENTS

| | | | |
|---|---|---|---|
| 6,422,005 B2 * | 7/2002 | Dolling et al. | 60/286 |
| 6,442,932 B1 * | 9/2002 | Hofmann et al. | 60/274 |
| 6,755,017 B2 * | 6/2004 | Katashiba et al. | 60/301 |
| 6,871,489 B2 * | 3/2005 | Tumati et al. | 60/285 |
| 6,892,531 B2 * | 5/2005 | Rim | 60/295 |
| 6,912,846 B2 * | 7/2005 | Huber et al. | 60/286 |
| 6,941,746 B2 * | 9/2005 | Tarabulski et al. | 60/286 |
| 7,017,336 B2 * | 3/2006 | Stiermann | 60/286 |
| 7,497,075 B2 * | 3/2009 | Ripper et al. | 60/286 |
| 7,500,356 B2 * | 3/2009 | Hirata et al. | 60/286 |
| 7,544,328 B2 * | 6/2009 | Osaku et al. | 422/527 |
| 7,677,631 B1 * | 3/2010 | Zischke et al. | 296/97.22 |
| 7,765,797 B2 * | 8/2010 | Duvinage et al. | 60/286 |
| 7,866,357 B2 * | 1/2011 | Compere et al. | 141/321 |
| 2004/0045284 A1 * | 3/2004 | Ripper et al. | 60/286 |
| 2004/0098978 A1 * | 5/2004 | Tarabulski et al. | 60/286 |
| 2005/0284135 A1 * | 12/2005 | Bertiller et al. | 60/286 |
| 2006/0117741 A1 * | 6/2006 | Mayer et al. | 60/286 |
| 2007/0075467 A1 * | 4/2007 | Osaku et al. | 266/81 |
| 2007/0246411 A1 * | 10/2007 | Milhas | 210/151 |
| 2008/0087739 A1 * | 4/2008 | Tarabulski et al. | 239/11 |
| 2008/0284152 A1 * | 11/2008 | Levin et al. | 280/830 |
| 2009/0038296 A1 * | 2/2009 | Fukuda et al. | 60/295 |
| 2009/0127265 A1 * | 5/2009 | Magnusson et al. | 220/564 |
| 2009/0155133 A1 * | 6/2009 | Osaku et al. | 422/173 |
| 2009/0188923 A1 * | 7/2009 | Versaw et al. | 220/564 |
| 2009/0277156 A1 * | 11/2009 | Hodgson et al. | 60/274 |
| 2009/0277162 A1 * | 11/2009 | Cominetti et al. | 60/297 |
| 2009/0293467 A1 * | 12/2009 | Boeckenhoff | 60/324 |
| 2010/0038162 A1 * | 2/2010 | Kamiya et al. | 180/69.6 |
| 2010/0107612 A1 * | 5/2010 | Yamazaki et al. | 60/295 |
| 2010/0132333 A1 * | 6/2010 | Endo et al. | 60/285 |
| 2010/0146948 A1 * | 6/2010 | DaCosta et al. | 60/295 |
| 2010/0162690 A1 * | 7/2010 | Hosaka et al. | 60/295 |
| 2010/0224284 A1 * | 9/2010 | Kolberg et al. | 141/325 |
| 2010/0269494 A1 * | 10/2010 | Saito et al. | 60/311 |
| 2010/0275588 A1 * | 11/2010 | Kamata et al. | 60/322 |
| 2010/0293928 A1 * | 11/2010 | Kamiya et al. | 60/295 |
| 2010/0313553 A1 * | 12/2010 | Cavanagh et al. | 60/310 |
| 2010/0327884 A1 * | 12/2010 | McCall et al. | 324/682 |
| 2011/0005210 A1 * | 1/2011 | Erdmann et al. | 60/295 |
| 2011/0023472 A1 * | 2/2011 | Saito et al. | 60/311 |

FOREIGN PATENT DOCUMENTS

| | | |
|---|---|---|
| DE | 102006059991 A1 | 6/2008 |
| DE | 102007002664 A1 | 7/2008 |
| DE | 102007019912 A1 | 11/2008 |
| DE | 102008051262 A1 | 6/2009 |
| JP | 2006-242092 | 9/2006 |
| JP | 2006242092 A | 9/2006 |
| JP | 2008265689 A * | 11/2008 |
| JP | 2008273372 A * | 11/2008 |
| WO | 2009/099104 A1 | 8/2009 |

* cited by examiner

EXHAUST-GAS PURIFICATION DEVICE DISPOSITION STRUCTURE OF VEHICLE

BACKGROUND OF THE INVENTION

The present invention relates to a disposition structure of an exhaust-gas purification device to purify exhaust gas from an internal combustion engine of a vehicle by using deoxidizer.

It is generally known that the nitrogen oxide (NOx) contained in the exhaust gas from the internal combustion engine (diesel engine, gasoline engine, etc.) of vehicles, such as an automotive vehicle, is purified by a NOx deoxidizing catalyst which is disposed in an engine exhaust pipe.

It has been recently proposed that the ammonia is used as the deoxidizer for improving the purification efficiency by the NOx deoxidizing catalyst. For example, if the urea water solution, as the deoxidizer, is added into the exhaust pipe upstream of the deoxidizing catalyst, the added urea water solution is heated and resolved by the exhaust gas of the engine, resulting in producing ammonia. This ammonia acts as the deoxidizer so that the purification of NOx in the exhaust gas can be promoted. Herein, instead of resolving the urea, the ammonia may be directly added into the exhaust gas upstream of the deoxidizing catalyst.

In a case where the above-described exhaust-gas purification system is applied, it may be necessary to provide a tank (deoxidizer tank) to accommodate the urea water solution or the ammonia, which is supported at a vehicle body. Japanese Patent Laid-Open Publication No. 2006-242092, for example, has proposed such a disposition structure (layout) of the deoxidizer tank.

According to the layout disclosed in the above-described patent publication, a space inside an engine room or a side cowl, below a font seat in a vehicle compartment, inside a bumper at a vehicle end, or a vehicle-body frame can be properly utilized. Thus, the volume of the deoxidizer tank can be increased, including providing plural tanks, and thereby the frequency in supply of the deoxidizer can be properly reduced.

Meanwhile, as well known, the ammonia has some toxicity and strong irritant odor. Accordingly, in case of a breakage of the deoxidizer tank, the leaking deoxidizer has to be prevented surely from entering into the vehicle compartment. It is also known that while the temperature at which the urea is resolved into the ammonia easily (the urea resolution temperature) is about 150 degrees C., the small amount of resolved ammonia gas may be produced even at the normal temperature. Therefore, it is preferable that not only the ammonia but the urea water solution be prevented surely from entering into the vehicle compartment.

In the conventional layout, however, the deoxidizer tank is disposed above the vehicle-body floor, so that there is a concern that the deoxidizer leaking from the broken tank would enter into the vehicle compartment. Particularly, in the engine room are provided several components and members with the surface temperature which is higher than the urea resolution temperature. Accordingly, in a case where the deoxidizer tank is disposed in the engine room, the leaking urea water solution tends to be resolved easily so as to produce the ammonia, resulting in a bad situation.

Further, there is another concern that in case of supplying the deoxidizer into the deoxidizer tank, the fuel into a fuel supply port which opens to the outside of the vehicle compartment, a wiper washer liquid into a pouring port which opens to the inside of the engine room, or the like, the wrong liquid would be supplied into the wrong port by mistake, for example, the fuel or the washer liquid are poured into the supply port of the deoxidization tank with confusion of the ports. Thus, it may be required that this mistake be surely prevented when laying out the deoxidizer tank.

SUMMARY OF THE INVENTION

The present invention has been devised in view of the above-described matters, and an object of the present invention is to prevent surely the deoxidizer from entering into the vehicle compartment even in case of the breakage of the deoxidizer tank, and avoid the mistake of supplying the wrong liquid into the wrong supply (pouring) port tank which may be made by confusing the ports.

According to the present invention, there is provided an exhaust-gas purification device disposition structure of a vehicle, comprising a fuel tank with a fuel supply port which is disposed so as to be open to an outside of a vehicle compartment, and a deoxidizer tank to accommodate deoxidizer to purify exhaust gas, the deoxidizer tank being disposed outside the vehicle compartment, a pouring port of the deoxidizer tank being provided inside the vehicle compartment.

According to the present invention, since the deoxidizer tank is disposed outside the vehicle compartment, even if the deoxidizer tank gets broken and the deoxidizer leaks out of the tank, the leaking deoxidizer may not enter into the vehicle compartment. Further, since the pouring port of the deoxidizer tank is provided inside the vehicle compartment, it can be properly avoided that the pouring port of the deoxidizer tank is confused with the fuel supply port of the fuel tank which opens to the outside of the vehicle compartment, or the pouring port of the washer tank which opens to the engine room. Accordingly, the mistake supply can be surely prevented.

According to an embodiment of the present invention, the pouring port of the deoxidizer tank is provided at an inner wall of the vehicle compartment at a position which faces to the deoxidizer tank. Thereby, the pouring port of the deoxidizer tank is disposed near the deoxidizer tank, so that the pouring path from the pouring port to the tank can be properly shortened and simplified.

According to another embodiment of the present invention, the deoxidizer tank is disposed below a floor panel. Thereby, the outside of the vehicle compartment is partitioned from the inside of that by the floor panel, so that the deoxidizer leaking out of the tank can be surely prevented from entering into the vehicle compartment. Further, the large and heavy deoxidizer tank is disposed below the floor panel, so that the center of gravity of the vehicle can be lowered properly compared with a case where it is disposed in the engine room or the side cowl or inside the vehicle compartment. Also, compared with a case where the tank is disposed in the bumper, the center of gravity of the vehicle can be located properly at the center of the vehicle in the longitudinal direction, thereby improving the maneuverability and stability of the vehicle.

According to another embodiment of the present invention, the deoxidizer tank is supported via a support member which allows the deoxidizer tank to move relative to a vehicle body, and the pouring port of the deoxidizer tank includes a move allowance means. Thereby, vibrations which occur below the floor panel during the vehicle traveling can be effectively prevented from transmitting to the vehicle compartment from the deoxidizer tank. Herein, since the pouring port of the deoxidizer tank includes the move allowance means, it can properly move following the tank moving relative to the vehicle body.

According to another embodiment of the present invention, the pouring port of the deoxidizer tank comprises a vehicle-body-side opening and a tank-side opening which is located away from the vehicle-body-side opening and a cap is provided at the tank-side opening. Thereby, even if a relative move between the deoxidizer tank and the vehicle body at the vehicle collision or the like occurs, the deoxidizer can be properly prevented from leaking out of the pouring port of the deoxidizer tank by the cap provided at the tank-side opening.

According to another embodiment of the present invention, another cap is provided at the vehicle-body-side opening. Thereby, entering of the leaking deoxidizer into the vehicle compartment can be prevented surely, and the outside air or the muddy water can be also prevented from entering into the vehicle compartment.

According to another embodiment of the present invention, a space portion between the vehicle-body-side opening and the tank-side opening is covered with a flexible enclosing cover, and the enclosing cover is made of a member that is weaker than members forming the vehicle-body-side opening and the tank-side opening. Thereby, entering of the outside air or the muddy water into the vehicle compartment via the vehicle-body-side opening can be prevented surely. Herein, the enclosing cover can properly absorb the slight moving of the deoxidizer tank relative to the vehicle body within a range of its flexibility. Further, since the enclosing cover is made of the member that is weaker than the members forming the above-described openings, if the move of the deoxidizer tank relative to the vehicle body is too large beyond the flexibility range, the enclosing cover may get broken first. Accordingly, a situation in which an extremely large force would act on the member forming the openings can be properly avoided.

According to another embodiment of the present invention, near the pouring port of the deoxidizer tank are provided an opening which interconnects the inside and the outside of the vehicle compartment, a lid to cover the opening, and the fuel supply port. Thereby, both supply of the deoxidizer and the fuel can be conducted to the vehicle which stops substantially at the same place. That is, unlike a case where the deoxidizer tank and the fuel tank are provided on the opposite sides of the vehicle to each other, or they are provided on the same side but considerably away from each other in the longitudinal direction, it may not be necessary to change the stop position of the vehicle in accordance with the kind of the supply objects, thereby improving the utility. Also, any concern of occurrence of the mistaken pouring caused by changing the stop position of the vehicle may be properly avoided.

According to another embodiment of the present invention, the deoxidizer tank is supported so as to be suspended below a floor of a baggage compartment at a vehicle rear portion, the fuel supply port is provided at a side face of the vehicle rear portion, and the lid is provided so as to close the opening of the baggage compartment. Thereby, the pouring port of the deoxidizer tank and the fuel supply port of the fuel tank can be located close to each other near the lid closing the opening of the baggage compartment at the rear of the vehicle.

According to another embodiment of the present invention, the deoxidizer tank is disposed behind the fuel tank with a specified lateral-direction gap from an exhaust pipe, which is provided so as to extend in a vehicle longitudinal direction and has an exhaust port at a rear end thereof. Thereby, even if the deoxidizer tank gets broken and the deoxidizer leaks, the surrounding temperature is not so high that the leaking deoxidizer may not be easily resolved by the heat and thereby the toxic deoxidizer can be restrained from being produced.

According to another embodiment of the present invention, the deoxidizer tank is covered with a cover member at least at a side face thereof which faces to the exhaust pipe and a lower face thereof. Thereby, even if the deoxidizer tank gets broken and the deoxidizer leaks, the cover member can properly prevent the leaking deoxidizer from scattering on the exhaust pipe. Accordingly, a situation in which the deoxidizer scatters on the exhaust pipe and the scattering deoxidizer is resolved by the heat of the exhaust pipe, which may cause the occurrence of the deoxidizer, can be properly avoided.

According to another embodiment of the present invention, the deoxidizer tank and the cover member are supported via a support member that allows the deoxidizer tank and the cover member to move relative to a vehicle body. Thereby, even if the deoxidizer tank gets broken, it drops along with the cover member, thereby preventing the deoxidizer from scattering toward the outside of the cover member.

According to another embodiment of the present invention, the deoxidizer tank is disposed at a vehicle rear portion, and a silencer is provided at a portion of the exhaust pipe which is located beside the deoxidizer tank. Thereby, since the deoxidizer tank is disposed at the vehicle rear portion, it can be located at a position which is away from a specified downstream portion of the exhaust pipe which has a relatively low temperature. Further, since at the exhaust pipe beside the deoxidizer tank is provided the silencer with a relatively-large surface area which can reduce the exhaust-gas temperature further, even if the deoxidizer leaking from the broken deoxidizer tank scatters on the silencer, the heat resolution of the deoxidizer can be restrained properly by the relatively low surface temperature of the silencer. Thus, the occurrence of the deoxidizer can be effectively avoided.

According to another embodiment of the present invention, a lateral-direction gap portion between the deoxidizer tank and the exhaust pipe is located right behind a tunnel portion which is formed at the floor panel so as to project upward and extend in the vehicle longitudinal direction. Thereby, the exhaust pipe beside the deoxidizer tank can be effectively cooled by the traveling air flowing down the tunnel portion, and an effective heat insulation therebetween can be achieved.

According to another embodiment of the present invention, in front of a lateral-direction gap portion between the deoxidizer tank and the exhaust pipe is provided a guide portion which is configured to guide the deoxidizer tank and the silencer which move forward at a vehicle rear collision in such a manner that at least one of the deoxidizer tank and the silencer gets away from the other in a vehicle width direction. Thereby, even if the vehicle rear collision causes the breakage of the deoxidizer tank and the leakage of the deoxidizer, the leaking deoxidizer can be properly prevented from scattering on the exhaust pipe.

According to another embodiment of the present invention, the guide portion has a shape operative to make traveling air flowing below the floor panel pass through the lateral-direction gap portion. Thereby, the exhaust pipe beside the deoxidizer tank can be more effectively cooled, and the heat insulation therebetween can be achieved more effectively.

Further, according to another embodiment of the present invention, the exhaust-gas purification device disposition structure further comprises a member operative to restrain vibration of the floor panel, the member being provided at a lower face of the floor panel between right and left rear side frames so as to extend between a rear end panel which connects to respective rear end portions of the rear side frames and a first cross member which is disposed in front of the rear end panel, wherein the deoxidizer tank is disposed so as to extend between the member and at least one of the rear side frames. Thereby, both restraint of the vibration of the floor panel which may be caused by the attachment of the deoxidizer tank and ensuring a proper volume of the tank can be provided.

According to another embodiment of the present invention, the member comprises a frame member which is provided so as to extend in the vehicle longitudinal direction and a second cross member which is provided so as to extend from a middle portion of the frame member in the vehicle longitudinal direction toward the one of the rear side frames. Thereby, likewise, the similar advantage to the above-described one can be provided.

According to another embodiment of the present invention, the deoxidizer tank is supported by a first band which connects to the member and the one of the rear side frames. Thereby, the band can be properly restrained from loosening due to deformation of the rear side frames at a vehicle rear collision, thereby supporting the deoxidizer tank properly.

According to another embodiment of the present invention, the member comprises a frame member which is provided so as to extend in the vehicle longitudinal direction and a second cross member which is provided so as to extend from a middle portion of the frame member in the vehicle longitudinal direction toward the one of the rear side frames, the first band is configured such that a rear end thereof is fixed to a rear portion of the one of the rear side frames and a front end thereof is fixed to a front end of the second cross member, there is provided a second band which connects to a front portion and a rear portion of the frame member respectively, and the deoxidizer tank is supported by the first and second bands. Thereby, likewise, the similar advantage to the above-described one can be provided.

According to another embodiment of the present invention, the second cross member is provided in such a manner that a closed cross section thereof on the side of the one of the rear side frames disconnects to the one of the rear side frames. Thereby, there can be provided a structure in which an improper transmission of the deformation of the rear side frames to the second cross member can be prevented. Accordingly, the support function of the deoxidizer tank can be improved.

According to another embodiment of the present invention, the frame member is provided so as to connect to the first cross member which is provided at the upper face of the floor panel. Thereby, the frame member can be configured to deform downward easily at the vehicle rear collision, so that improper interferences of the deoxidizer tank with any components, such as a fuel pipe, can be prevented properly.

According to another embodiment of the present invention, the frame member is configured such that an area of a closed cross section of a front portion thereof decreases gradually. Thereby, the above-described advantage can be improved, and there can be provided an appropriate layout without any interference with a suspension cross member and the like which are located forward.

According to another embodiment of the present invention, the deoxidizer in deoxidizer tank is urea based compound which is in a liquid state at a normal temperature. Thereby, since the urea based compound liquid of the deoxidizer at the normal temperature has a relatively low toxicity and irritant odor, handling of the deoxidizer may be properly easy. Further, even if the deoxidizer tank gets broken and the deoxidizer leaks out accordingly, the ammonia gas may not be produced by the resolution at the normal temperature. Thus, any bad situation may be prevented from occurring.

Other features, aspects, and advantages of the present invention will become apparent from the following description which refers to the accompanying drawings.

BRIEF DESCRIPTION OF THE DRAWINGS

FIGS. 8A, 8B and 8C are explanatory diagrams of a crash mode of a urea tank which is used by a shape of a sub frame.

DETAILED DESCRIPTION OF THE INVENTION

Figure 1:
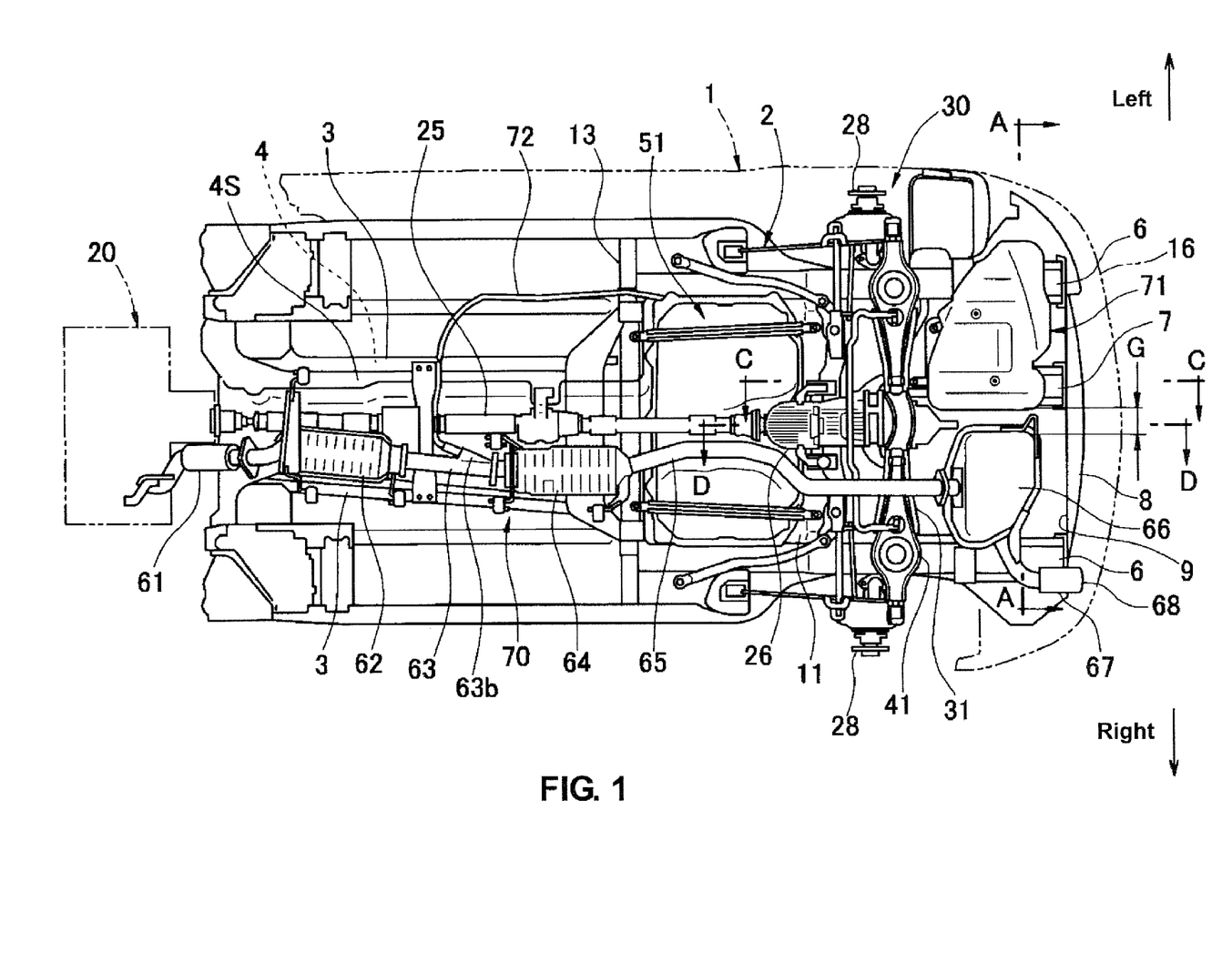
FIG. 1 is a bottom view of a floor of a vehicle compartment of an automotive vehicle equipped with an exhaust-gas purification device according to an embodiment of the present invention.
Figure 2:
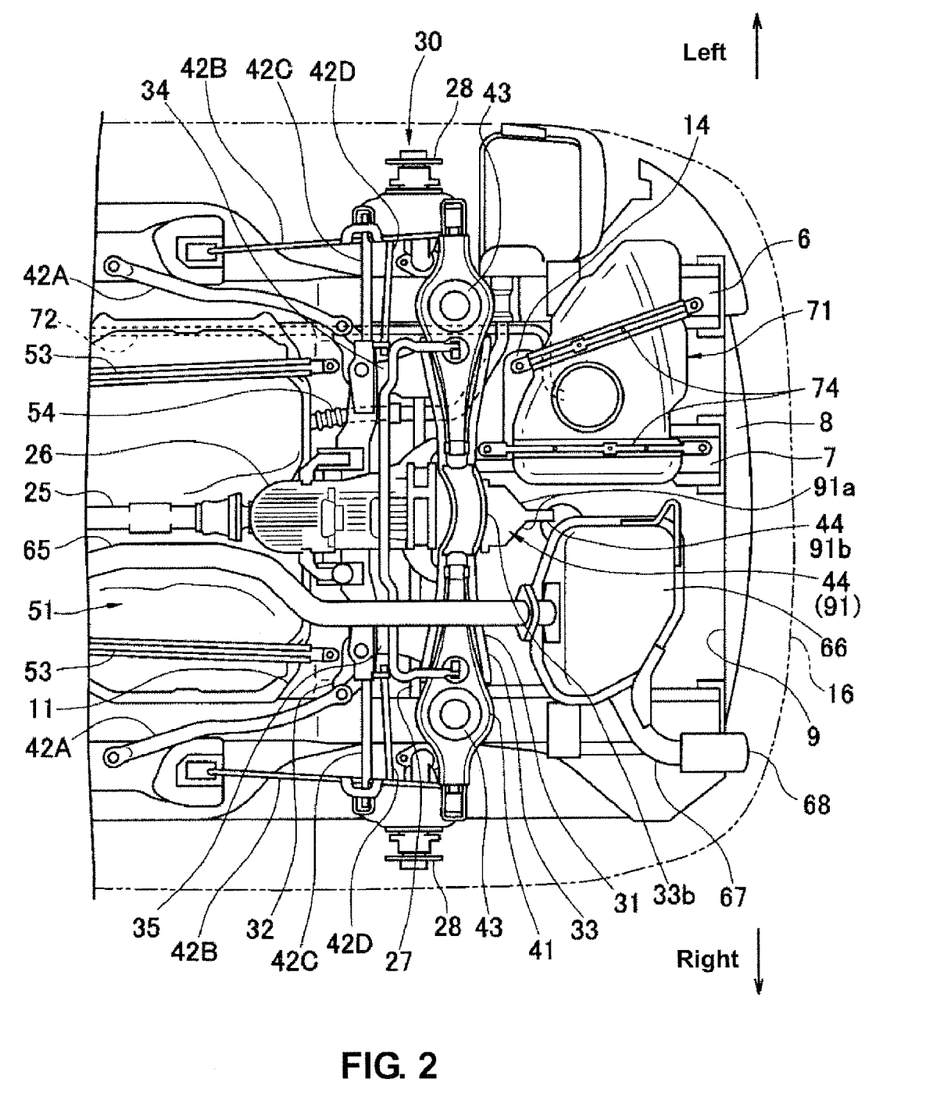
FIG. 2 is a partially-enlarged bottom view of a vehicle rear portion of FIG. 1.
Figure 3:
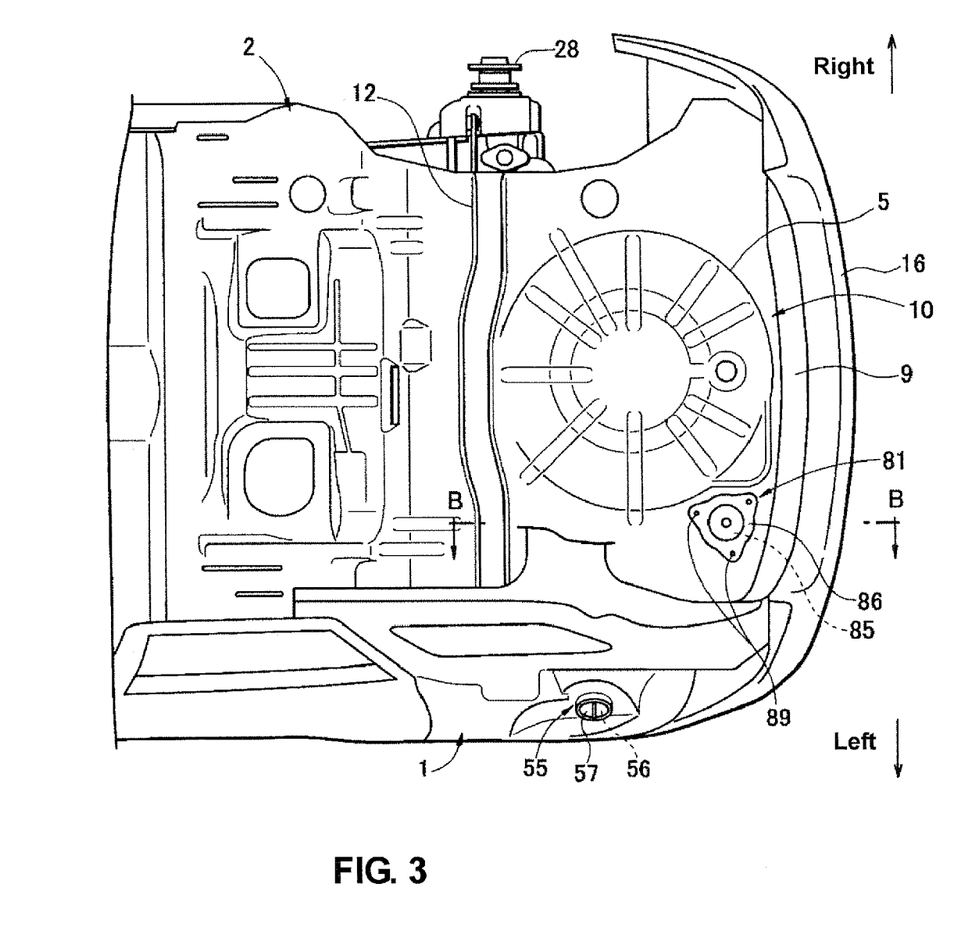
FIG. 3 is a plan view of the floor at the vehicle rear portion.
Figure 4:
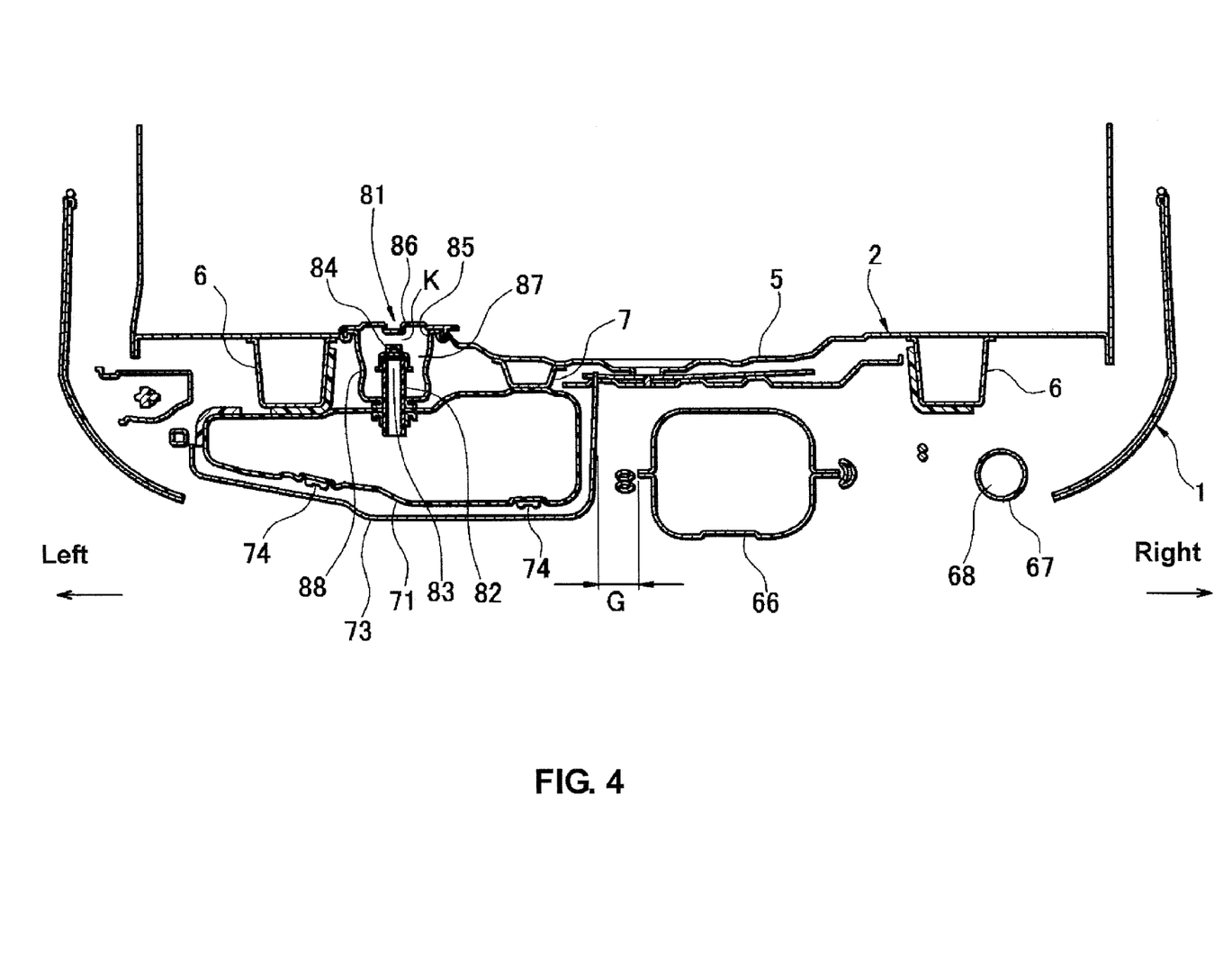
FIG. 4 is a sectional view taken along line A-A of FIG. 1.
Figure 5:
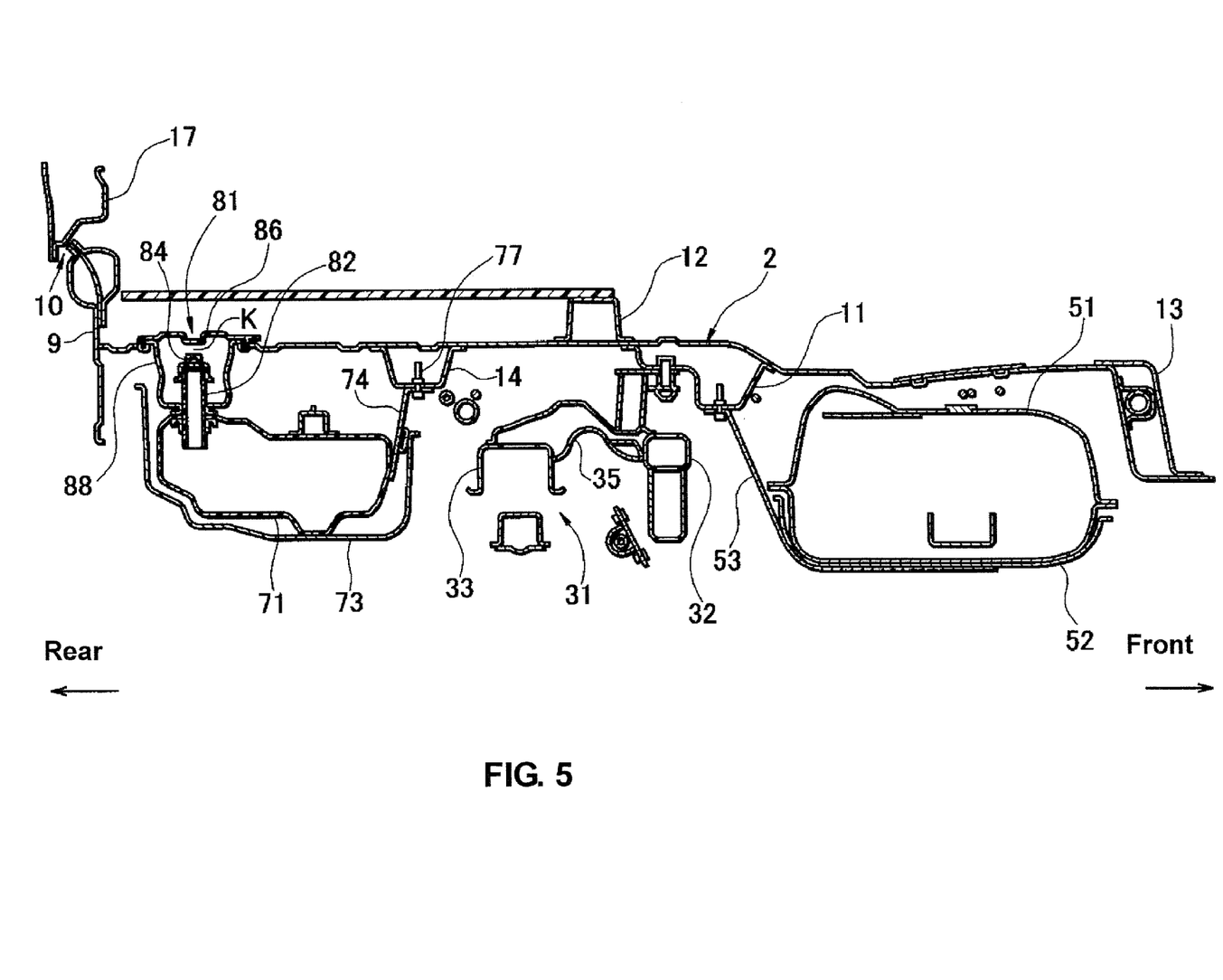
FIG. 5 is a partial sectional view taken along line B-B of FIG. 3.
Figure 6:
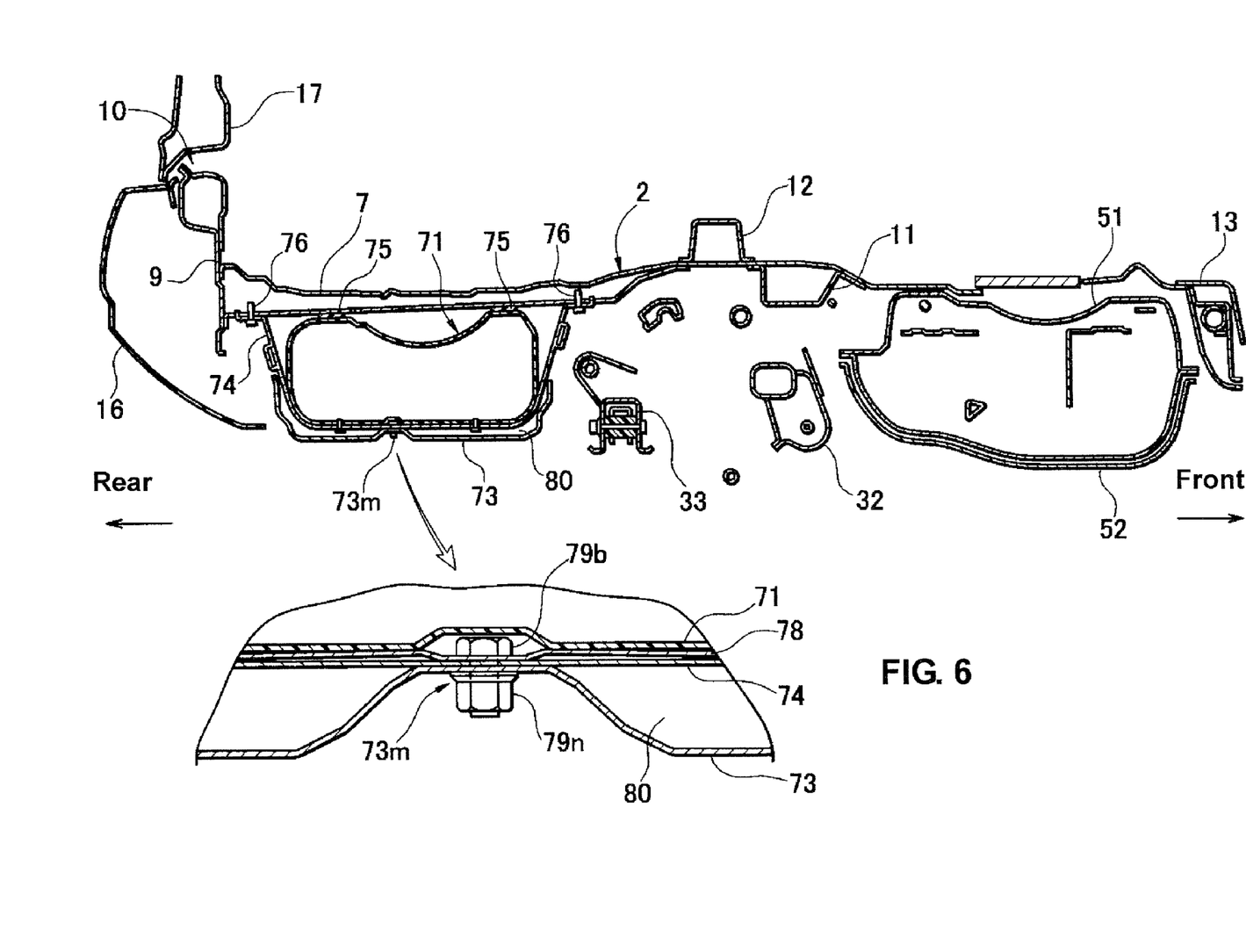
FIG. 6 is a partial sectional view taken along line C-C of FIG. 1.
Figure 7:
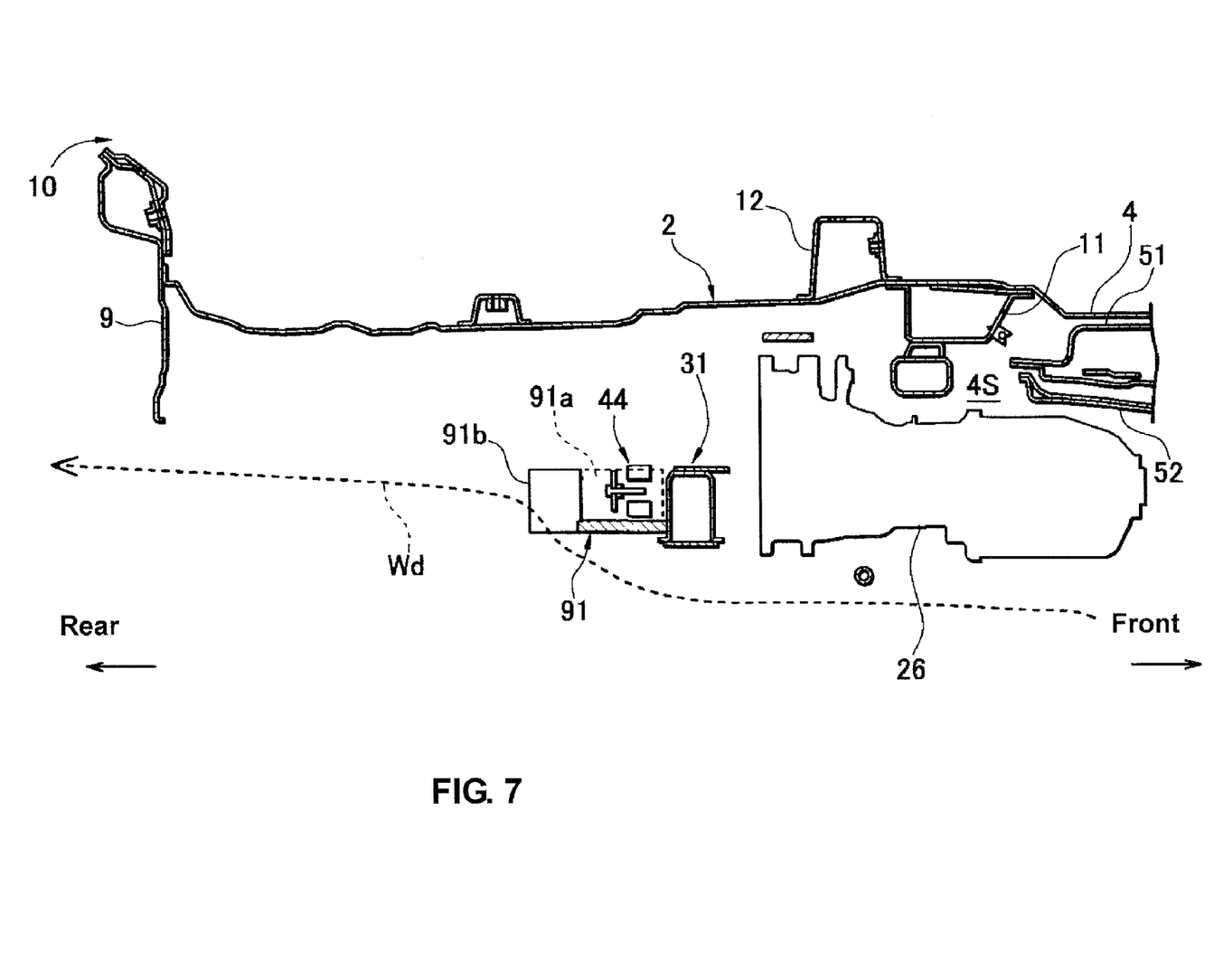
FIG. 7 is a sectional view taken along line D-D of FIG. 1.

Hereinafter, a preferred embodiment of the present invention will be described referring to the accompanying drawings. FIG. 1 is a bottom view (seen from below) of a floor of a vehicle compartment of an automotive vehicle equipped with an exhaust-gas purification device according an embodiment of the present invention. FIG. 2 is a partially-enlarged bottom view of a vehicle rear portion of FIG. 1. FIG. 3 is a plan view of the floor at the vehicle rear portion. FIG. 4 is a sectional view taken along line A-A of FIG. 1. FIG. 5 is a partial sectional view taken along line B-B of FIG. 3. FIG. 6 is a partial sectional view taken along line C-C of FIG. 1. FIG. 7 is a sectional view taken along line D-D of FIG. 1.

As apparent from FIG. 1, an automotive vehicle according to the present embodiment comprises a power transmission system from an engine unit 20 to a rear differential gear 26 and an engine exhaust system which extends from the engine unit 20 to a vehicle rear end, which are disposed below a vehicle floor panel 2. The power transmission system has a known structure basically, in which the engine unit 20 includes an internal combustion engine, such as a diesel engine, and a transmission which are coupled integrally. Herein, the output of the transmission is transmitted to the rear differential gear via a propeller shaft 25, and then to right and left wheel supports 28 via right and left drive shafts 27 (see FIG. 2). Thereby, both-side rear wheels 29 are driven (see FIGS. 8A-8C).

Floor members 3 which extend in the vehicle longitudinal direction and have a closed cross section respectively are provided at the floor panel 2. These floor members 3 are formed at both sides of the propeller shaft 25 and the engine exhaust system. Between the floor members 3 are provided a tunnel portion 4 which projects upward and extends in the longitudinal direction. The propeller shaft 25 and the engine exhaust system are disposed so as to extend in a space 4S (tunnel space) of the tunnel portion 4. The tunnel space 4S extends to a position right behind the rear differential gear 26.

During the vehicle traveling, the traveling air flowing down the tunnel space 4S (see a broken-line arrow Wd in FIG. 7) can effectively cool the components of the power transmission system of the propeller shaft 25, rear differential gear 26 and the like, and the engine exhaust system.

As shown in FIGS. 1 and 2, the rear portion of the vehicle body 1 is supported by a pair of rear side frames 6 at its both ends below the floor panel 2. Rear end portions of the rear side frames 6 connect to a rear end cross member 8 which extends in the vehicle width direction at the vehicle rear end. A rear bumper 16 is attached to the rear end cross member 8 via a rear end panel 9 which is provided so as to stand at the vehicle rear end. A center frame 7, which extends longitudinally substantially in parallel to the rear side frames, is disposed at a position which is substantially the center of the rear side frames 6 but a slightly offset to either one of the rear side frames 6 (to the left, for example). A rear end of the center frame 7 connects to the rear bumper 16 via the rear end panel 9 as well.

The both rear side frames 6 are coupled to each other via a cross member 12 (an upper cross member, which corresponds to a first cross member in the claims of the present invention) at their middle portion (see FIG. 3). A front end of the center frame 7 connects to the upper cross member 12 via the floor panel 2 from below. Further, a lower cross member 11 (see FIG. 6), which extends in the vehicle width direction, is disposed on a lower face side of the floor panel 2 at a position which is slightly in front of the upper cross member 12. At a position which is forward away from the lower cross member 11 is provided a middle cross member 13 to interconnect the both rear side frames 6. A fuel tank 51 is disposed between the middle cross member 13 and the lower cross member 11.

As shown in FIGS. 5 and 6, the fuel tank 51, which is made of synthetic resin, for example, is covered with a cover member 52 (insulator) which is made of an aluminum plate, for example, at its lower face (preferably, almost a half of its lower part). Further, the fuel tank 51 is supported so as to be suspended between the middle cross member 13 and the lower cross member 11 with a plurality of support bands 53 (front and left two bands, for example) which extend below the insulator 52. The support bands 53 are made of metal which may be known as a band. The support bands 53 may be made of resin which has preferable mechanical properties. A fuel supply pipe 54 (see FIG. 2) to supply fuel to the fuel tank 51 is provided so as to extend from a rear portion of the tank 51 to a fuel supply portion 55 (see FIG. 3) with a fuel supply port 56 which is provided on a left side face of the rear portion of the vehicle body 1 so as to open to the outside of the vehicle compartment. The fuel supply portion 55 is located near a rear opening 10 which is operative to open a rear end of the vehicle compartment to the outside of the vehicle compartment (i.e., for connection between the inside and the outside of the vehicle compartment). This rear opening 10 can be closed by a rear gate 17 (see FIGS. 5 and 6).

A sub frame 31 to suspend a rear wheel suspension device 30 is provided at a middle portion of the rear side frame 6. As apparent from FIG. 2, the sub frame 31 comprises a pair of front and rear cross members (front cross member 32, rear cross member 33), and a pair of right and left side members 34, 35 which interconnect both ends of the cross members 32, 33, respectively. Thus, the sub frame 31 is formed in a frame shape. Preferably, at the center of the rear cross member 33 is formed a rearward curve portion 33*b*, the center of which projects rearward. The function of this rearward curve portion will be described later.

Lower arms 41, various link members 42A-42D, springs 43, dynamic dampers 44 and the like, which constitute the rear suspension device 30, are installed to the above-described sub frame 31 to form a suspension assembly. This suspension assembly is attached to the vehicle body 1 via resilient mount members at plural portions.

Next, the engine exhaust system will be described. The engine exhaust system is provided in the longitudinal direction along the propeller shaft 25 of the power transmission system as shown in FIG. 1. The engine exhaust system, which is substantially the same as the conventional one equipped with the exhaust-gas purification device using the urea water solution, includes a first exhaust pipe 61, an upstream catalyst unit 62, a second exhaust pipe 63, a downstream catalyst unit 64, a third exhaust pipe 65, a silencer 66, and a fourth exhaust pipe 67 in order from the upstream of the engine exhaust ports.

The upstream end of the first exhaust pipe 61 connects to the engine exhaust port, and its downstream end connects to the upstream catalyst unit 62. The second exhaust pipe 63 is located between the upstream catalyst unit 62 and the downstream catalyst unit 64, and as described later, the urea water solution of the deoxidizer is supplied into the second exhaust pipe 63. The upstream end of the third exhaust pipe 65 connects to the downstream catalyst unit 64, and its downstream end connects to the silencer 66. The upstream end of the fourth exhaust pipe 67 connects to the silencer 66, and its downstream end has an exhaust port 68. Since the surface area of the silencer 66 is considerably large, the temperature of the exhaust gas may be reduced greatly. Herein, at least part of the fourth exhaust pipe 67 and the first exhaust pipe 6 may be made of a flexible tube.

The upstream catalyst unit 62, which is like the conventional one, accommodates an oxidizing catalyst and a device for trapping particulates in the exhaust gas (so-called "DPF"). Hydrocarbon (HC) and carbon monoxide (CO) contained in the exhaust gas are oxidized by the oxidizing catalyst. Particulates materials (so-called "PM") are trapped by a porous filter of PDF which is disposed in the exhaust gas flow. Thus, the exhaust gas can be purified.

An exhaust-gas purification device 70 which is disposed in the exhaust system downstream the upstream catalyst unit 62 functions to purify the nitrogen oxide (NOx) contained in the exhaust gas by the so-called SCR method. The downstream catalyst unit 64, which itself is known, accommodates an upstream catalyst and a downstream catalyst. Herein, the upstream catalyst promotes the reaction of NOx and the deoxidizer such as ammonia for purification, which is a so-called selective contact deoxidizing catalyst. Meanwhile, the downstream catalyst solves excessive ammonia to prevent a so-called ammonia slip (ammonia release phenomenon), which is an excessive deoxidizer oxidizing catalyst.

In the exhaust-gas purification device 70 of the present embodiment, the urea water solution as the deoxidizer is added into the second exhaust pipe 63 upstream the upstream catalyst of the downstream catalyst unit 64 when the ammonia is used as the deoxidizer for improving the purification efficiency of the NOx deoxidizing catalyst. For this purpose, a urea supply pipe 72 is provided so as to extend from the deoxidizer tank 71 (urea tank) supported below the floor panel 2, a terminal of which connects to a branch pipe 63*b* of the second exhaust pipe 63. A connecting terminal of the urea pipe 63 preferably connects to an injection nozzle (not shown) which is provided in the above-described branch pipe 63*b*. A pump is disposed in the urea tank 71, which is not illustrated, and the urea water solution is supplied via the urea supply pipe 72 by this pump, and finally injected to a downstream portion in the second exhaust pipe 63.

Thus, the urea water solution supplied to the upstream of the downstream catalyst unit 64 is resolved by the heat of the engine exhaust gas, resulting in producing of the ammonia. The reaction of this ammonia and the deoxidizer occurs, so that the purification of NOx contained in the exhaust gas can be promoted. Since the urea water solution has a relatively low toxicity and irritant odor, compared with the ammonia, and is liquid at the normal temperature, its handling is properly easy. That is, the deoxidizer (ammonia) to purify the NOx contained in the engine exhaust gas is produced through the heat resolution of the deoxidizer (urea water solution) which is less toxic than the above-described deoxidizer (ammonia) and less combustible than the fuel, and eventually the exhaust-gas purification is done by using this produced deoxidizer (ammonia).

Further, even if the deoxidizer tank (urea tank 71) gets broken and the deoxidizer leaks out accordingly, the ammonia gas may not be produced by the resolution at the normal temperature. Thus, any bad situation may be prevented from occurring. The urea supply system including the urea tank 71 and the urea supply pipe 72, the second exhaust pipe 63 to which the urea water solution is supplied, and the downstream catalyst unit 64 constitutes the exhaust-gas purification device 70 of the present embodiment.

In the present embodiment, the urea tank 71 is disposed below the floor panel 2 as described above, and also behind the fuel tank 51 with a specified lateral-direction gap G from the exhaust system. That is, the urea tank 71 is disposed below the floor panel 2 between the sub frame 31 of the rear suspension assembly and the rear end cross member 8 with the specified lateral-direction gap G from the silencer 66 of the exhaust system. Accordingly, the urea tank 71 is located rather rearward from the fuel tank 51 disposed between the middle cross member 13 and the lower cross member 11.

As described above, the urea tank 71 is disposed below the floor panel 2. Thereby, the urea tank 71 is surely partitioned from the vehicle compartment by the floor panel 2, so that even if the urea tank 71 gets broken and the urea water solution leaks out, the leaking urea water solution can be surely prevented from entering into the vehicle compartment. Further, the large and heavy urea tank 71 is disposed below the floor panel 2, so that the center of gravity of the vehicle can be lowered properly compared with a case where it is disposed in the engine room or the side cowl or inside the vehicle compartment. Also, compared with a case where the tank is disposed in the bumper, the center of gravity of the vehicle can be located at the center of the vehicle in the longitudinal direction, thereby improving the maneuverability and stability of the vehicle.

Further, the urea tank 71 is disposed behind the fuel tank 51, thereby the fuel tank 51 containing the fuel which is more combustible than the urea water solution can be properly located at the center portion of the vehicle in the longitudinal direction. Thus, the safety against the vehicle rear collision (collision from behind) can be improved. Meanwhile, the urea tank 71 is disposed rearward relative to the fuel tank 51 and at a position which is the specified lateral-direction gap G away from the downstream portion (specifically, the silencer 66) of the exhaust system which has a relatively low temperature. Thereby, even if the urea tank 71 gets broken and the urea water solution leaks out, the surrounding temperature is not so high that the leaking urea water solution may not be easily resolved by the heat, and thereby the ammonia having some toxicity and irritant odor can be restrained from being produced.

Particularly, since the urea tank 71 is disposed at the rear portion of the vehicle body 1, it can be located at a position which is the specified lateral-direction gap G away from the downstream portion of the exhaust system which has the considerably low temperature. Further, since at the exhaust system beside the urea tank 71 is provided the silencer 66 with the large surface area which can reduce the exhaust-gas temperature further, even if the urea water solution leaking from the tank 71 scatters on the silencer 66, the heat resolution of the urea water solution can be restrained properly by the relatively low surface temperature of the silencer 66. Thus, the occurrence of the ammonia can be effectively avoided.

Next, the specific disposition structure of the urea tank 71 will be described.

The urea tank 71 is covered with a cover member 73 (insulator), which is made of synthetic resin for example, at least at its right side face which faces to the exhaust system (silencer 66) and its lower face. The cover member 73 is made of an aluminum plate, for example, and preferably formed in a recess shape as shown in FIGS. 4-6. Thereby, even if the urea tank 71 gets broken and the urea water solution leaks out, the cover member 73 can properly prevent the leaking urea water solution from scattering on the exhaust system. Accordingly, the occurrence of the ammonia caused by the heat resolution of the urea water solution can be avoided.

The urea tank 71 is suspended between the sub frame 31 of the suspension assembly and the rear end cross member 8 with a plurality of support bands 74 (for example, two bands). In FIG. 2, however, the support structure of the urea tank 71 with the support bands 74 is shown without the cover member 73 for clarity.

More specifically, as apparent from FIGS. 1, 2 and 6, the right end portion of the urea tank 71 is located below the center frame 7, and it is preferably provided so as to contact the lower face of the center frame 7 via a resilient cushion 75 (see FIG. 6). Both ends of the right support band 74 are fixed to the lower face of the center frame 7 with screws 76. Meanwhile, as apparent from FIGS. 1, 2, 4 and 5, the left end portion of the urea tank 71 is located below the rear side frame 6, and it contacts the lower face of the rear side frame 6 via a resilient cushion (not illustrated). A front end of the center of the urea tank 71 is located below a gusset 14 (corresponding to a second cross member in the claims of the present invention) which extends laterally from a middle portion of the center frame 7 in the vehicle longitudinal direction toward and near the one of the rear side frames 6, 6. A rear end of the left support band is fixed to the lower face of the rear side frame 6, and its front end is fixed to the lower face of the gusset 14 with a screw 77 (see FIG. 5).

The disposition location of the urea tank 71 corresponds to the left side of the vehicle compartment rear portion as shown in FIG. 3. A pouring port 81 to supply the urea water solution to the urea tank 71 is disposed in a left-side corner of the vehicle compartment rear a portion beside a tire pan 5.

As shown in FIG. 6, a band cover 78 is preferably provided between the support bands 74 and the lower face of the urea tank 71. The cover member 73 is fixed to the support bands 74 and the band cover 78 with bolts 79b and nuts 79n at its plural upward-projecting attaching portions 73m as shown. The support bands 74 are provided so as to extend below the lower face of the urea tank 71, so that the whole lower face and most part of the side face of the urea tank 71 are covered with the cover member 73. A space 80 is formed between the cover member 73 and the urea tank 71 at another area than the above-described attaching portions 73m. The air located in this space 80 improves the heat insulation function by the cover member 73. Herein, the support bands 74 and the band cover 78 are known metal-made members, like the support bands 53 of the fuel tank 51. The support bands 74 and the band cover 78 may be made of resin which has preferable mechanical properties.

The support bands 74 are slightly extendable because the cushions 75, 75 between the urea tank 71 and the vehicle body (the center frame 7 in the example of FIG. 6) absorb the move and vibration of the urea tank 71. Accordingly, when the vibration is inputted to the vehicle body (particularly, the floor panel 2 and other components below the floor panel 2)

during the vehicle traveling, the tank 71 and the cover member 73 slightly move within an extendable range of the support bands 74. That is, the urea tank 71 and the cover member 73 are supported via the support member (support bands 74) which allow them to move relative to the vehicle body 1.

Thereby, the vibrations which occur below the floor panel 2 during the vehicle traveling can be effectively prevented from transmitting from the urea tank 7 to the vehicle compartment. Further, since the urea tank 71 and the cover member 73 are supported via the support bands 74 which allow them to move relative to the vehicle body 1, even if the support bands 74 get broken, the urea tank 71 is dropped along with the cover member 73, thereby preventing the urea water solution from scattering toward the outside of the cover member 73.

While the urea tank 71 is disposed with the specified lateral-direction gap G from the silencer 66 as described above (see FIG. 1), this gap G between the members 71, 66 is located right behind the above-described tunnel portion 4. The tunnel portion 4 is formed so as to project upward and extend in the longitudinal direction as described above, and the propeller shaft 25 and the engine exhaust system extend through the tunnel space 4S which extends to a position right behind the rear differential gear 26. That is, the above-described gap G between the urea tank 71 and the silencer 66 is located right behind the rear differential gear 26.

Thereby, the exhaust system (silencer 66) beside the urea tank 71 can be effectively cooled by the traveling air Wd flowing down the tunnel space 4S (see FIG. 7), and the effective heat insulation between the urea tank 71 and the silencer 66 can be achieved.

Further, a guide member 91 to increase the safety of the urea tank 71 against the vehicle rear collision is provided in front of the above-described lateral-direction gap portion G between the urea tank 71 and the silencer 66 and right behind the rear differential gear 26 (see FIGS. 2 and 7). This guide member 91 is constituted by using a case body of a dynamic damper 44 which is attached to the sub frame 31 of the suspension assembly, for example. The guide member 91 includes a slant face portion 91a which has a taper expanding forward and a plate-shaped rear end piece 91b which extends rearward from a base point of the slant face portion 91a.

Since the guide member 91 is provided in front of the above-described lateral-direction gap portion G between the urea tank 71 and the silencer 66, the urea tank 71 and the silencer 66 which move forward at the vehicle rear collision are guided by the slant face portion 91a of the guide member 91 in such a manner that at least one of them gets away from the other in the vehicle width direction. Thereby, even if the vehicle rear collision causes the breakage of the urea tank 71 and the leakage of the urea water solution, the leaking urea water solution can be properly prevented from scattering on the silencer 66.

Since the guide member 91 includes the slant face portion 91a which has the taper expanding forward (namely, becoming narrower rearward) and the plate-shaped rear end piece 91b which extends rearward from the base point of the slant face portion 91a, the traveling air Wd which flows down below the floor panel 2 (particularly, into the tunnel space 4S) is guided by the guide member 91 so as to pass through the above-described lateral-direction gap portion G between the urea tank 71 and the silencer 66. Thereby, the silencer 66 beside the urea tank 71 can be effectively cooled by the traveling air flowing, and the effective heat insulation between the both 71, 66 can be achieved.

Figure 8A:
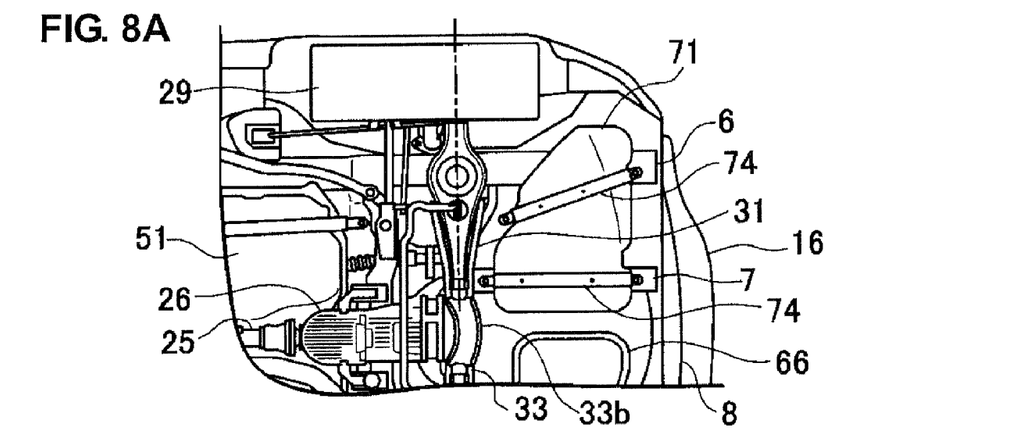
FIG. 8A is a bottom view of the urea tank in a normal state.
Figure 8B:
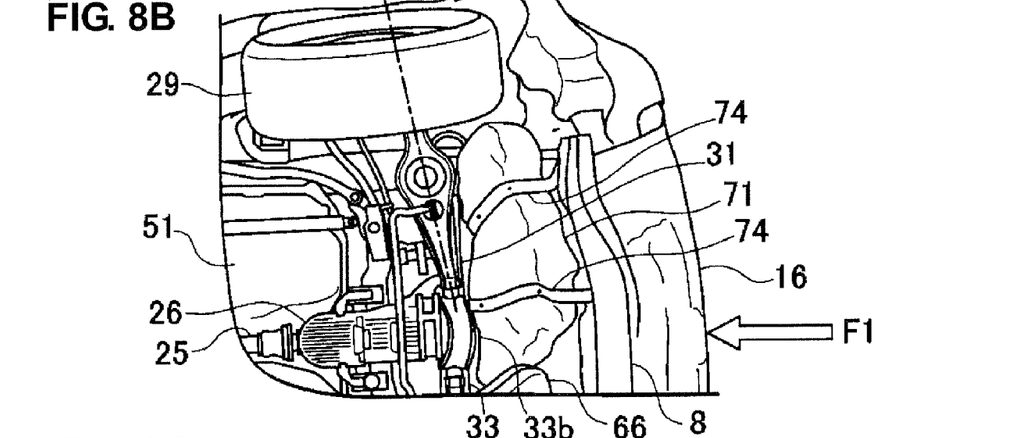
FIG. 8B is a bottom view of the urea tank showing the crash mode at a heavy collision.
Figure 8C:
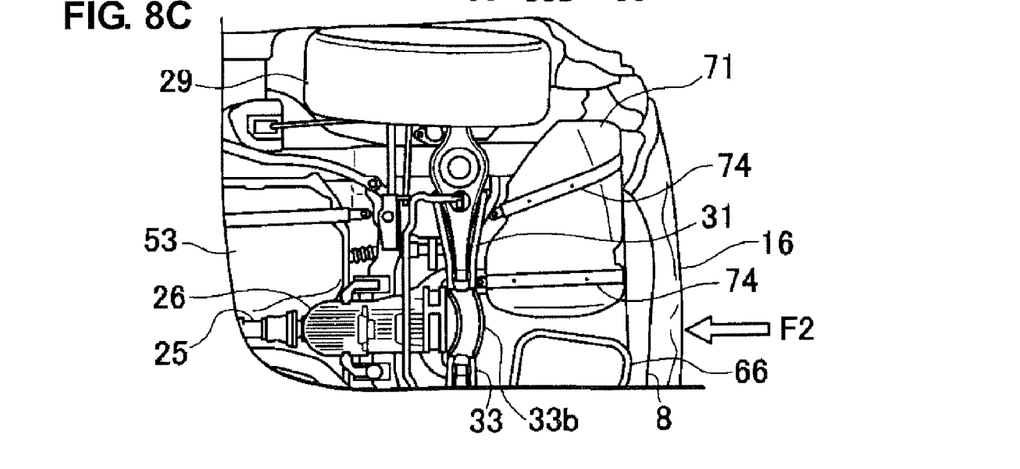
FIG. 8C is a bottom view of the urea tank showing the crash mode at a light collision.

Herein, the similar function to the above-described function of the guide member 91 may be obtained by using the shape of the sub frame 31 of the suspension assembly. FIGS. 8A, 8B and 8C are explanatory diagrams of a crash mode of the urea tank 71 which is used by the shape of the sub frame 31: FIG. 8A is a bottom view of the urea tank 71 in a normal state; FIG. 8B is a bottom view of the urea tank 71 showing the crash mode at a heavy collision; and FIG. 8C is a bottom view of the urea tank 71 showing the crash mode at a light collision.

As described above, the rear cross member 33 of the sub frame 31 of the suspension assembly has the rearward curve portion 33b which projects rearward at the center. The plan shape of the rearward curve portion 33b performs the similar function to the function of the "taper expanding forward" of the guide member 91.

In the light collision which may not make the urea tank 71 cause a large load to the rear cross member 33 of the sub frame 31 (collision load F2), as shown in FIG. 8C, only the urea tank 71 and the silencer 66 may move, resulting in little damage to the urea tank 71, Meanwhile, in the heavy collision which may make the urea tank 71 cause the large load to the rear cross member 33 of the sub frame 31 (collision load F1), in which the urea tank 71 might receive a large damage as shown in FIG. 8B, the front side of the center portion of the rear cross member 33 contacts the rear end portion of the rear differential gear 26 and thereby the rear cross member 33 bends in such a manner that its both-side ends move forward. Accordingly, the urea tank 71 and the silencer 66 which move forward are guided in such a manner that at least one of them gets away from the other in the vehicle width direction. Thus, a similar function to the function of the above-described guide member 91 provided in front of the lateral-direction gap portion G between the urea tank 71 and the silencer 66 can be performed.

Hereinafter, the location relationship between the pouring port 81 of the urea tank 71 and the fuel supply port 56 of the fuel tank 51 will be described. As shown in FIG. 3, the fuel supply portion 55 having the fuel supply port 56 of the fuel tank 51 is provided on the left side face of the rear portion of the vehicle body 1 as described, and the fuel supply portion 55, which has a cap 57 for the fuel supply port 56, is located near the rear opening 10 which is formed at the vehicle rear end so as to connect the inside to the outside of the vehicle compartment.

Meanwhile, as described above, the urea tank 71 is suspended at a portion corresponding to the left side of the vehicle compartment rear portion which is below the floor panel 2 and between the sub frame 31 of the suspension assembly and the rear end cross member 8. The pouring port 81 to supply the urea water solution to the urea tank 71 is disposed near the left-side corner of the vehicle compartment rear portion beside the tire pan 5 of the floor panel 2.

As described above, according to the present embodiment, the pouring port 81 of the urea tank 71 is disposed in the vehicle compartment despite the urea tank 71 itself being disposed outside the vehicle compartment (below the floor panel 2). Thereby, even if the urea tank 71 gets broken and the urea water solution leaks out, the leaking urea water solution can be surely prevented from entering into the vehicle compartment. Further, it can be properly avoided that the pouring port 81 of the urea tank 71 is confused with the fuel supply port 56 of the fuel tank 51 which opens to the outside of the vehicle compartment, or the pouring port (not illustrated) of the washer tank which opens to the engine room. Accordingly, the mistake supply can be surely prevented.

Further, as shown in FIGS. 4 and 5, the pouring port 81 of the urea tank 71 is disposed at a portion of the vehicle compartment inner wall (floor panel 2) which faces to the urea tank 71. Thereby, the pouring port 81 is provided near the urea tank 71, so that the supply path from the pouring port 81 to the urea tank 71 can be shortened and simplified.

The pouring port 81 comprises a floor-side opening 85 and a tank-side opening 83 which is located away from the floor-side opening 85. The tank-side opening 83 is formed at a tip of a supply cylinder 82 which projects upward from the urea tank 71 and is made of synthetic resin, for example, and a cap 84 is provided at the tank-side opening 83. The floor-side opening 85 is comprised of a hole which is formed at the floor panel 2. A cap 86 (floor-side cap) is provided at the floor-side opening 85 as well. This floor-side cap 86 is detachably provided at the hole (floor-side opening 85) of the floor panel 2 with plural screws 89 (see FIG. 3). In the assembly state of the urea tank 71 to the vehicle body 1, the upper face of the tank-side cap 84 is away from the lower face of the floor-side cap 86 by a specified distance.

Since the tank-side opening 83 comprises the cap 84, even if there occurs a relative move between the urea tank 71 and the vehicle body 1 at the vehicle collision or the like, the urea water solution can be properly prevented from leaking out of the pouring port 81 with the cap 84 provided at the tank-side opening 83. Further, since the cap 86 is provided at the floor-side opening 85 as well, the urea water solution can be surely prevented from leaking out of the pouring port 81 and entering into the vehicle compartment. Also, the outside air or the muddy water can be prevented from entering into the vehicle compartment from below the floor panel 2.

As described above, the urea tank 71 is supported via the support member (support band) allowing its move relative to the vehicle body 1, thereby effectively restraining the vibration occurring below the floor panel 2 during the vehicle traveling from transmitting from the urea tank 71 to the vehicle compartment. Meanwhile, the pouring port 81 of the urea tank 71 comprises the floor-side opening 85 and the tank-side opening 83, which are away from each other in the vertical direction, and a gap K is provided between the both 85, 83 (specifically, between the upper face of the tank-side cap 84 and the lower face of the floor-side cap 86). Accordingly, even if the urea tank 71 moves relative to the vehicle body 1 (floor panel 2) during the vehicle traveling and the like, the upper face of the tank-side cap 84 and the lower face of the floor-side cap 86 may not interfere with each other, thereby allowing the move of the urea tank 71 without interrupting.

Further, a space portion 87 between the floor-side opening 85 and the tank-side opening 83 is covered with a flexible enclosing cover 88, which may be made of rubber, clothes, or soft resin. A lower end of the enclosing cover 88 is attached to the periphery of the supply cylinder on the side of the tank, and its upper end is attached near a peripheral edge of the floor-side opening 85. The enclosing cover 88 is made of a member which is weaker (i.e., may be more easily broken) than a member (floor panel 2) forming the vehicle-body-side opening 85 and a member (supply cylinder 82) forming the tank-side opening 83.

Thus, since the space portion 87 between the floor-side opening 85 and the tank-side opening 83 is covered with the flexible enclosing cover 88, entering of the outside air or the muddy water into the vehicle compartment via the floor-side opening 85 can be prevented surely. Herein, the enclosing cover 88 can properly absorb the slight moving of the urea tank 71 relative to the vehicle body 1 within a range of its flexibility. Further, since the enclosing cover 88 is made of the member that is weaker than the respective members 2, 82 forming the above-described openings 85, 83, if the move of the urea tank 71 relative to the vehicle body 1 is too large beyond the flexibility range, the enclosing cover 88 may get broken first. Accordingly, a situation in which an extremely large force would act on the members 2, 82 forming the openings 85, 83 can be properly avoided.

As described above, the fuel supply port 56 of the fuel tank 51 is provided on the left face of the rear portion of the vehicle body 1 and located near the rear opening 10 to interconnect the inside and the outside of the vehicle compartment at the rear end of the vehicle compartment (i.e., near the rear gate 17). Meanwhile, the pouring port 81 of the urea tank 71 is disposed beside the tire pan 5 and near the left-side corner of the vehicle compartment rear portion, which is also located near the rear gate 17. That is, the pouring port 81 of the urea tank 71 and the fuel supply port 56 of the fuel tank 51 are disposed at the left-side portion of the vehicle body rear portion.

Thus, since the pouring port 81 of the urea tank 71 and the fuel supply port 56 of the fuel tank 51 are disposed near the same lid (rear gate 17) so as to be adjacent to each other, both supplies of the urea water solution and the fuel can be conducted to the vehicle which stops substantially at the same place. That is, unlike a case where the pouring port 81 of the urea tank 71 and the fuel supply port 56 of the fuel tank 51 are provided on the opposite sides of the vehicle to each other, or they are provided on the same side but considerably away from each other in the longitudinal direction, it may not be necessary to change the stop position of the vehicle in accordance with the kind of the supply objects, thereby improving the utility. Also, any concern of occurrence of the mistaken pouring caused by changing the stop position of the vehicle may be properly avoided. In this case, the vehicle stop position may be determined so that the left-side rear portion of the vehicle body 1 can face to supply facilities of the urea water solution or the fuel.

The present invention should not be limited to the above-described embodiment, and any other modifications and improvements may be applied within the scope of a spit of the present invention.

What is claimed is:

1. An exhaust-gas purification device disposition structure of a vehicle, comprising:
a fuel tank with a fuel supply port which is disposed so as to be open to an outside of a vehicle compartment; and
a deoxidizer tank to accommodate deoxidizer to purify exhaust gas, the deoxidizer tank being disposed outside the vehicle compartment, a pouring port of the deoxidizer tank being provided inside the vehicle compartment,
wherein said deoxidizer tank is disposed below a floor panel and behind said fuel tank with a specified lateral-direction gap from an exhaust pipe, which is provided so as to extend in a vehicle longitudinal direction and has an exhaust port at a rear end thereof, and
said exhaust-gas purification device disposition structure further comprises a member operative to restrain vibration of the floor panel, the member being provided at a lower face of the floor panel between right and left rear side frames so as to extend between a rear end panel which connects to respective rear end portions of the rear side frames and a first cross member which is disposed in front of the rear end panel, wherein said deoxidizer tank is disposed so as to extend between said member and at least one of the rear side frames.

2. The exhaust-gas purification device disposition structure of a vehicle of claim 1, wherein said member comprises a frame member which is provided so as to extend in the vehicle longitudinal direction and a second cross member which is provided so as to extend from a middle portion of the frame member in the vehicle longitudinal direction toward said one of the rear side frames.

3. The exhaust-gas purification device disposition structure of a vehicle of claim 1, wherein said deoxidizer tank is supported by a first band which connects to said member and said one of the rear side frames.

4. The exhaust-gas purification device disposition structure of a vehicle of claim 3, wherein said member comprises a frame member which is provided so as to extend in the vehicle longitudinal direction and a second cross member which is provided so as to extend from a middle portion of the frame member in the vehicle longitudinal direction toward said one of the rear side frames, said first band is configured such that a rear end thereof is fixed to a rear portion of said one of the rear side frames and a front end thereof is fixed to a front end of the second cross member, there is provided a second band which connects to a front portion and a rear portion of said frame member respectively, and said deoxidizer tank is supported by the first and second bands.

5. The exhaust-gas purification device disposition structure of a vehicle of claim 2, wherein said second cross member is provided in such a manner that a closed cross section thereof on the side of said one of the rear side frames disconnects to said one of the rear side frames.

6. The exhaust-gas purification device disposition structure of a vehicle of claim 2, said frame member is provided so as to connect to said first cross member which is provided at the upper face of the floor panel.

7. The exhaust-gas purification device disposition structure of a vehicle of claim 6, wherein said frame member is configured such that an area of a closed cross section of a front portion thereof decreases gradually.

8. The exhaust-gas purification device disposition structure of a vehicle of claim 1, wherein deoxidizer in deoxidizer tank is urea based compound which is in a liquid state at a normal temperature.

9. The exhaust-gas purification device disposition structure of a vehicle of claim 1, wherein said pouring port of the deoxidizer tank is provided at an inner wall of the vehicle compartment at a position which faces to the deoxidizer tank.

10. The exhaust-gas purification device disposition structure of a vehicle of claim 1, wherein near the pouring port of the deoxidizer tank are provided an opening which interconnects the inside and the outside of the vehicle compartment, a lid to close said opening, and said fuel supply port.

11. The exhaust-gas purification device disposition structure of a vehicle of claim 10, wherein said deoxidizer tank is supported so as to be suspended below a floor of a baggage compartment at a vehicle rear portion, said fuel supply port is provided at a side face of the vehicle rear portion, and said lid is provided so as to close the opening of the baggage compartment.

12. The exhaust-gas purification device disposition structure of a vehicle of claim 1, wherein said deoxidizer tank is covered with a cover member at least at a side face thereof which faces to the exhaust pipe and a lower face thereof.

13. The exhaust-gas purification device disposition structure of a vehicle of claim 12, wherein said deoxidizer tank and said cover member are supported via a support member which allows the deoxidizer tank and the cover member to move relative to a vehicle body.

14. An exhaust-gas purification device disposition structure of a vehicle, comprising:
a fuel tank with a fuel supply port which is disposed so as to be open to an outside of a vehicle compartment; and
a deoxidizer tank to accommodate deoxidizer to purify exhaust gas, the deoxidizer tank being disposed outside the vehicle compartment, a pouring port of the deoxidizer tank being provided inside the vehicle compartment,
wherein said deoxidizer tank is disposed below a floor panel and supported via a support member which allows the deoxidizer tank to move relative to a vehicle body,
said pouring port of the deoxidizer tank includes a move allowance means and comprises a vehicle-body-side opening and a tank-side opening which is located away from the vehicle-body-side opening and a cap is provided at the tank-side opening, and
a space portion between the vehicle-body-side opening and the tank-side opening is covered with a flexible enclosing cover, and the enclosing cover is made of a member that is weaker than members forming the vehicle-body-side opening and the tank-side opening.

15. The exhaust-gas purification device disposition structure of a vehicle of claim 14, wherein another cap is provided at said vehicle-body-side opening.

16. An exhaust-gas purification device disposition structure of a vehicle, comprising:
a fuel tank with a fuel supply port which is disposed so as to be open to an outside of a vehicle compartment; and
a deoxidizer tank to accommodate deoxidizer to purify exhaust gas, the deoxidizer tank being disposed outside the vehicle compartment, a pouring port of the deoxidizer tank being provided inside the vehicle compartment,
wherein said deoxidizer tank is disposed below a floor panel and behind said fuel tank with a specified lateral-direction gap from an exhaust pipe, which is provided so as to extend in a vehicle longitudinal direction and has an exhaust port at a rear end thereof,
said deoxidizer tank is disposed at a vehicle rear portion, and a silencer is provided at a portion of the exhaust pipe which is located beside the deoxidizer tank, and
a lateral-direction gap portion between the deoxidizer tank and the exhaust pipe is located right behind a tunnel portion which is formed at the floor panel so as to project upward and extend in the vehicle longitudinal direction.

17. An exhaust-gas purification device disposition structure of a vehicle, comprising:
a fuel tank with a fuel supply port which is disposed so as to be open to an outside of a vehicle compartment; and
a deoxidizer tank to accommodate deoxidizer to purify exhaust gas, the deoxidizer tank being disposed outside the vehicle compartment, a pouring port of the deoxidizer tank being provided inside the vehicle compartment,
wherein said deoxidizer tank is disposed below a floor panel and behind said fuel tank with a specified lateral-direction gap from an exhaust pipe, which is provided so as to extend in a vehicle longitudinal direction and has an exhaust port at a rear end thereof,
said deoxidizer tank is disposed at a vehicle rear portion, and a silencer is provided at a portion of the exhaust pipe which is located beside the deoxidizer tank, and
in front of a lateral-direction gap portion between the deoxidizer tank and the exhaust pipe is provided a guide portion which is configured to guide the deoxidizer tank and the silencer which move forward at a vehicle rear collision in such a manner that at least one of the deoxidizer tank and the silencer gets away from the other in a vehicle width direction.

18. The exhaust-gas purification device disposition structure of a vehicle of claim 17, wherein said guide portion has a shape operative to make traveling air flowing below the floor panel pass through said lateral-direction gap portion.

* * * * *